(12) United States Patent
Ogawa et al.

(10) Patent No.: US 11,777,137 B2
(45) Date of Patent: *Oct. 3, 2023

(54) MEMBER FOR ELECTROCHEMICAL DEVICES, AND ELECTROCHEMICAL DEVICE

(71) Applicant: LG ENERGY SOLUTION, LTD., Seoul (KR)

(72) Inventors: Hideyuki Ogawa, Tokyo (JP); Yusuke Sera, Tokyo (JP)

(73) Assignee: LG ENERGY SOLUTION, LTD., Seoul (KR)

( * ) Notice: Subject to any disclaimer, the term of this patent is extended or adjusted under 35 U.S.C. 154(b) by 728 days.

This patent is subject to a terminal disclaimer.

(21) Appl. No.: 16/606,273

(22) PCT Filed: Jan. 26, 2018

(86) PCT No.: PCT/JP2018/002548
§ 371 (c)(1),
(2) Date: Oct. 18, 2019

(87) PCT Pub. No.: WO2018/193683
PCT Pub. Date: Oct. 25, 2018

(65) Prior Publication Data
US 2021/0135275 A1 May 6, 2021

(30) Foreign Application Priority Data

Apr. 21, 2017 (WO) ............... PCT/JP2017/016084

(51) Int. Cl.
*H01M 10/0562* (2010.01)
*C08K 3/04* (2006.01)
(Continued)

(52) U.S. Cl.
CPC .......... *H01M 10/0562* (2013.01); *C08K 3/04* (2013.01); *C08K 3/041* (2017.05); *C08K 3/105* (2018.01);
(Continued)

(58) Field of Classification Search
CPC ............... H01M 10/0562; H01M 4/62; H01M 10/0525; H01M 2300/0077; C08K 3/04;
(Continued)

(56) References Cited

U.S. PATENT DOCUMENTS 6,395,419 B1    5/2002   Kuwahara et al.
11,462,767 B2 *  10/2022  Sera ...................... H01M 4/139
(Continued)

FOREIGN PATENT DOCUMENTS

CN   101162791 A   4/2008
CN   101356668 A   1/2009
(Continued)

OTHER PUBLICATIONS

Machine translation of JP 2006-049158 (Year: 2006).*
(Continued)

*Primary Examiner* — Doris L Lee
(74) *Attorney, Agent, or Firm* — Bryan Cave Leighton Paisner LLP

(57) ABSTRACT

Disclosed is a member for electrochemical devices comprising a current collector, an electrode mixture layer provided on the current collector, and an electrolyte layer provided on the electrode mixture layer in this order, wherein the electrode mixture layer comprises an electrode active material, a polymer having a structural unit represented by the following formula (1), at least one electrolyte salt selected from the group consisting of lithium salts, sodium salts, calcium salts, and magnesium salts, and a molten salt having a
(Continued)

melting point of 250° C. or less, and the electrolyte layer comprises an inorganic solid electrolyte:

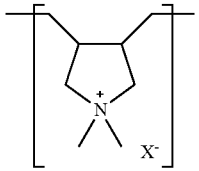

(1)

wherein X⁻ represents a counter anion.

14 Claims, 5 Drawing Sheets

(51) Int. Cl.
| | | |
|---|---|---|
| C08K 3/105 | (2018.01) | |
| C08K 3/22 | (2006.01) | |
| C08L 79/04 | (2006.01) | |
| H01M 4/62 | (2006.01) | |
| H01M 10/0525 | (2010.01) | |

(52) U.S. Cl.
CPC ............... *C08K 3/22* (2013.01); *C08L 79/04* (2013.01); *H01M 4/62* (2013.01); *H01M 10/0525* (2013.01); *C08K 2003/2203* (2013.01); *C08K 2003/2262* (2013.01); *C08K 2003/2289* (2013.01); *C08K 2003/2293* (2013.01); *H01M 2300/0077* (2013.01)

(58) Field of Classification Search
CPC .......... C08K 3/041; C08K 3/105; C08K 3/22; C08K 2003/2203; C08K 2003/2262; C08K 2003/2289; C08K 2003/2293; C08L 79/04
See application file for complete search history.

(56) References Cited

U.S. PATENT DOCUMENTS

| | | | |
|---|---|---|---|
| 2005/0221188 A1 | 10/2005 | Takami et al. | |
| 2008/0160324 A1 | 7/2008 | Ohmori et al. | |
| 2010/0075222 A1 | 3/2010 | Watanabe | |
| 2010/0112449 A1* | 5/2010 | Fujita | H01M 4/36 429/231.95 |
| 2011/0300432 A1* | 12/2011 | Snyder | H01M 4/485 429/122 |
| 2012/0183868 A1* | 7/2012 | Toussaint | H01M 6/24 204/251 |
| 2012/0301794 A1 | 11/2012 | Koh et al. | |
| 2013/0106029 A1 | 5/2013 | Snyder et al. | |
| 2015/0079485 A1 | 3/2015 | Choi et al. | |
| 2015/0155566 A1 | 6/2015 | Kim et al. | |
| 2016/0149224 A1 | 5/2016 | Okuno | |
| 2016/0181658 A1 | 6/2016 | Kim et al. | |
| 2017/0018802 A1 | 1/2017 | Omoda et al. | |
| 2018/0277897 A1 | 9/2018 | Sugita et al. | |
| 2021/0111430 A1 | 4/2021 | Ogawa | |
| 2021/0135275 A1 | 5/2021 | Ogawa | |

FOREIGN PATENT DOCUMENTS

| | | |
|---|---|---|
| CN | 102522589 A1 | 6/2012 |
| CN | 102754267 A | 10/2012 |
| CN | 103329335 A | 9/2013 |
| CN | 110537274 A | 12/2019 |
| EP | 1619742 A | 1/2006 |
| EP | 2415793 A1 | 2/2012 |
| EP | 3279973 A1 | 2/2018 |
| JP | H11-162513 A | 6/1999 |
| JP | 2000-090728 A | 3/2000 |
| JP | 2000-164254 A | 6/2000 |
| JP | 2003-077539 A | 3/2003 |
| JP | 2006-032237 A | 2/2006 |
| JP | 2006-49158 * | 2/2006 |
| JP | 2006-049158 A | 2/2006 |
| JP | 2006-120517 A | 5/2006 |
| JP | 2006-294326 A | 10/2006 |
| JP | 2007-141467 A | 6/2007 |
| JP | 2008-053135 A | 3/2008 |
| JP | 2008-243736 A | 10/2008 |
| JP | 2010-153375 A | 7/2010 |
| JP | 2011-054519 | 3/2011 |
| JP | 2011-070793 A | 4/2011 |
| JP | 2011-108499 A | 6/2011 |
| JP | 2011-129400 A | 6/2011 |
| JP | 2012-518248 A | 8/2012 |
| JP | 2013-019154 A | 1/2013 |
| JP | 2013-191547 A | 9/2013 |
| JP | 2013-214510 A | 10/2013 |
| JP | 2014-007258 A | 1/2014 |
| JP | 2015005493 A | 1/2015 |
| WO | 99/040025 A1 | 8/1999 |
| WO | 2011/037060 A1 | 3/2011 |
| WO | 2015/068324 A1 | 5/2015 |
| WO | 2015/097952 A1 | 7/2015 |
| WO | 2017/047015 A1 | 3/2017 |

OTHER PUBLICATIONS

Brinkkötter et al., "Influence of anion structure on ion dynamics in polymer gel electrolytes composed of poly(ionic iqud), ionic liquid and Li salt", Electrochimica Acta, 237, May 2017, p. 237-p. 247 (cited in an office action dated Apr. 26, 2021 in U.S. Appl. No. 16/606,493).

Safa et al., "Polymeric Ionic Liquid Gel Electrolyte for Room Temperature Lithium Battery Applications", Electrochimica Acta,213, Sep. 2016, p. 587-p. 593 (cited in an office action dated Apr. 26, 2021 in U.S. Appl. No. 16/606,493).

Li et al., "Polymeric ionic liquid-ionic plastic crystal all-solid-state electrolytes for wide operating temperature range lithium metal batteries", Journal of Materials Chemistry A, Sep. 5, 2017, p. 21362-p. 21369 (cited in an office action dated Apr. 26, 2021 in U.S. Appl. No. 16/606,493).

Kaiya Koji, "High School Course TV Learning Memo: Molecular Polarity", online, NHK accessed on Feb. 14, 2020 https://www.nhk.or.jp/kokokoza/library/tv/kagakukiso/, Oct. 2019 (cited in an office action in counterpart JP Patent Application No. P2019-510989 dated Feb. 20, 2020).

Oeda Kazunari, "Properties of Teflon® Fluorine Resin", online,Packing Land Co., Ltd. accessed on Feb. 14, 2020 URL: https://www.packing.co.jp/PTFE/ptfe_tokusei1.htm, Oct. 2006 (cited in an office action in counterpart JP Patent Application No. P2019-510989 dated Feb. 20, 2020).

Yundong Zhou et al., "N-ethyl-N-methylpyrrolidinium bis(fluorosulfonyl)imide-electrospun polyvinylidene fluoride composite electrolytes: characterization and lithium cell studies", Phys. Chem. Chem, phys., vol. 19, p. 2225-p. 2234, Dec. 19, 2016 (cited in an office action dated Aug. 18, 2022, in counterpart CN Patent Application No. 201780089690.4).

Bhandary Rajesh et al, "Polymer effect on lithium ion dynamics in gel polymer electrolytes: Cationic versus acrylate polymer", Electrochimica Acta, Elsevier, Amsterdam, NL, vol. 174, Jun. 11, 2015, p. 753-p. 761, XP029250951 (cited in a Search Report in counterpart EP Patent Application No. 17906396.1 dated Oct. 28, 2020).

Ruisi Zhang et al., "Ionic Liquid-Doped Gel Polymer Electrolyte for Flexible Lithium-Ion Polymer Batteries", 2015 (cited in a office action dated Nov. 24, 2021 in U.S. Appl. No. 16/617,048).

G.B. Appetecchi et al., "Ternary polymer electrolytes containing pyrrolidinium-based polymeric ionicliquids for lithium batteries",

(56) References Cited

OTHER PUBLICATIONS

Journal of Power Sources vol. 195(11), 2010, p. 3668-p. 3675 (cited in ISRs of Appln. No. PCT/JP2018/016318 dated Jun. 12, 2018 and PCT/JP2017/016079 dated Jul. 4, 2017).

Anne-Laure Pont et al., "Pyrrolidinium-based polymeric ionic liquids as mechanically andelectrochemicaily stable polymer electrolytes", Journal of Power Sources vol. 188 (2), 2009, p. 558-p. 563 (cited in ISRs of Appln. No. PCT/JP2018/016318 dated Jun. 12, 2018 and PCT/JP2017/016079 dated Jul. 4, 2017, and cited in specification).

P. Hovington et al., "New Lithium Metal Polymer Solid State Battery for an Ultrahigh Energy: Nano C—LiFePO4 versus Nano Li1.2V3O8", Nano Letters, 2015, 15(4), p. 2671-p. 2678 (cited in specification of copending U.S. Appl. No. 16/606,493).

Yoshizawa-Fujita et al., "A Plastic Elecrtolyte Material in a Highly Desirable Temprature Range: N-Ethyl-N-methylpyrrolidinium Bis(fluorosulfonyl)amide", Chemistry Letters, 2014; vol. 43, p. 1909-p. 1911 (cited in an office action dated Aug. 27, 2021 in U.S. Appl. No. 16/606,493).

\* cited by examiner (a)

(b)

MEMBER FOR ELECTROCHEMICAL DEVICES, AND ELECTROCHEMICAL DEVICE

CROSS-REFERENCE TO RELATED APPLICATIONS

This application is a U.S. national phase application filed under 35 U.S.C. § 371 of International Application No. PCT/JP2018/002548, filed Jan. 26, 2018, designating the United States, which claims priority from International Application No. PCT/JP2017/016084, filed Apr. 21, 2017, which are hereby incorporated herein by reference in their entirety.

TECHNICAL FIELD

The present invention relates to a member for an electrochemical device electrode and an electrochemical device.

BACKGROUND ART

Lithium ion secondary batteries, which are energy devices having a high energy density, have been used as power sources for portable devices such as notebook computers and mobile phones, electric vehicles, and the like, with their characteristics taken advantage of.

A lithium ion secondary battery predominantly used now sandwiches a separator between a positive electrode and a negative electrode, and the separator is impregnated with an organic electrolyte solution. In such a lithium ion secondary battery, when the temperature of the battery rises due to occurrence of an abnormality, there is a possibility of liquid leakage and ignition from an organic electrolyte solution which is flammable. In lithium ion secondary batteries, in order to start achieving a higher energy density and enlargement, it is important to enhance the safety, and it is required that circumstances such as ignition be avoided in the configuration of the lithium ion secondary batteries.

From this fact, development of lithium ion secondary batteries of a configuration in which an organic electrolyte solution that may cause ignition and the like is not used has proceeded. In particular, development of solid electrolytes has been actively made. However, when a solid electrolyte is employed as an electrolyte layer, an interface between the solid electrolyte and an electrode active material comprised in an electrode mixture layer is unlikely to be formed due to the low flexibility and fluidity of the solid electrolyte. This tendency is pronounced especially when an oxide-based inorganic solid electrolyte is used. As one of measures to solve this, enhancing the ionic conductivity of the electrode mixture layer has been investigated. For example, a method for adding an inorganic solid electrolyte to an electrode mixture layer in a lithium ion battery is disclosed in Patent Literature 1.

CITATION LIST

Patent Literature

Patent Literature 1: JP No. 2013-191547

SUMMARY OF INVENTION

Technical Problem

However, the inorganic solid electrolyte used in the method described in Patent Literature 1 is poor in flexibility, and it is difficult for the electrolyte to change its shape to conform to the shape of voids inside the electrode mixture layer in the positive electrode and the negative electrode. Thus, desired characteristics of batteries may not be obtained. When the amount of the inorganic solid electrolyte added is increased in order to enhance the interface formability, the ratio of the electrode active material in the electrodes relatively decreases, and thus, the energy density of the battery tends to decrease.

The present invention has been made in consideration of the situation described above, and it is a primary object thereof to provide a member for electrochemical devices capable of enhancing the battery characteristics, even when an inorganic solid electrolyte is used in the electrolyte layer.

Solution to Problem

A first aspect of the present invention is a member for electrochemical devices comprising a current collector, an electrode mixture layer provided on the current collector, and an electrolyte layer provided on the electrode mixture layer in this order, wherein the electrode mixture layer comprises an electrode active material, a polymer having a structural unit represented by the following formula (1), at least one electrolyte salt selected from the group consisting of lithium salts, sodium salts, calcium salts, and magnesium salts, and a molten salt having a melting point of 250° C. or less, and the electrolyte layer comprises an inorganic solid electrolyte. The member for electrochemical devices may be a member for secondary batteries.

wherein $X^-$ represents a counter anion.

According to the member for electrochemical devices of the first aspect of the present invention, a good interface is formed between the electrolyte layer and the electrode mixture layer and thus, it is possible to improve the battery characteristics.

The inorganic solid electrolyte may be an oxide. The inorganic solid electrolyte may be an oxide represented by the following formula (2) or an oxide represented by the following formula (3):

$$Li_{7-b}La_{3-a}A^1{}_aZr_{2-b}M^1{}_bO_{12} \qquad (2)$$

wherein, $A^1$ represents at least one metal element selected from the group consisting of Y, Nd, Sm, and Gd, $M^1$ represents at least one metal element selected from the group consisting of Nb and Ta, $0 \leq a < 3$, and $0 \leq b < 2$, $$Li_{1+c+d}Al_c(Ti,Ge)_{2-c}Si_dP_{3-d}O_{12} \qquad (3)$$

wherein, $0 \leq c < 2$ and $0 \leq d < 3$.

The content of the polymer in the electrode mixture layer may be 10 to 30% by mass based on the total amount of the polymer, the electrolyte salt, and the molten salt.

The anion of the electrolyte salt may be a bis(fluorosulfonyl)imide anion or a bis(trifluoromethanesulfonyl)imide anion.

The cation of the electrolyte salt may be a 1-ethyl-3-methylimidazolium cation, a N,N-diethyl-N-methyl-N-(2-methoxyethyl)ammonium cation, or a N-methyl-N-propylpyrrolidinium cation.

When the electrode mixture layer is a negative electrode mixture layer and the electrode active material is a negative electrode active material, the negative electrode active material may be at least one selected from the group consisting of graphite, amorphous carbon, carbon black, metal oxides, metal lithium, metal sodium, metal calcium, and metal magnesium.

A second aspect of the present invention is an electrochemical device comprising a pair of electrodes each having an electrode mixture layer, and an electrolyte layer provided between the pairs of electrode, wherein the electrode mixture layer comprises an electrode active material, a polymer having a structural unit represented by the following formula (1), at least one electrolyte salt selected from the group consisting of lithium salts, sodium salts, calcium salts, and magnesium salts, and a molten salt having a melting point of 250° C. or less, and the electrolyte layer comprises an inorganic solid electrolyte. The electrochemical device may be a secondary battery.

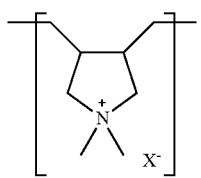

(1)

wherein X⁻ represents a counter anion.

The inorganic solid electrolyte may be an oxide. The inorganic solid electrolyte may be an oxide represented by the following formula (2) or an oxide represented by the following formula (3):

$$Li_{7-b}La_{3-a}A^1{}_aZr_{2-b}M^1{}_bO_{12}$$ (2)

wherein, $A^1$ represents at least one metal element selected from the group consisting of Y, Nd, Sm, and Gd, $M^1$ represents at least one metal element selected from the group consisting of Nb and Ta, $0 \leq a < 3$, and $0 \leq b < 2$, $$Li_{1+c+d}Al_c(Ti,Ge)_{2-c}Si_dP_{3-d}O_{12}$$ (3)

wherein, $0 \leq c < 2$ and $0 \leq d < 3$.

The content of the polymer in the electrode mixture layer may be 10 to 30% by mass based on the total amount of the polymer, the electrolyte salt, and the molten salt.

The anion of the electrolyte salt may be a bis(fluorosulfonyl)imide anion or a bis(trifluoromethanesulfonyl)imide anion.

The cation of electrolyte salt may be a 1-ethyl-3-methylimidazolium cation, a N,N-diethyl-N-methyl-N-(2-methoxyethyl)ammonium cation, or a N-methyl-N-propylpyrrolidinium cation.

When the pair of electrodes is a positive electrode having a positive electrode mixture layer comprising a positive electrode active material and a negative electrode having a negative electrode mixture layer comprising a negative electrode active material, the negative electrode active material may be at least one selected from the group consisting of graphite, amorphous carbon, carbon black, metal oxides, metal lithium, metal sodium, metal calcium, and metal magnesium.

Advantageous Effects of Invention

According to the present invention, provided are a member for electrochemical devices capable of enhancing the battery characteristics, even when an inorganic solid electrolyte is used in the electrolyte layer, and an electrochemical device in which the same is used.

DESCRIPTION OF EMBODIMENTS

Hereinbelow, embodiments of the present invention will be described with reference to the drawings. However, the present invention is not intended to be limited to the following embodiments. In the following embodiments, their components (including steps) are not essential unless otherwise explicitly stated. Dimensions of the components in each drawing are imaginary, and the relative relationship of the dimension between the components is not limited to those shown in each drawing.

The same shall apply to numerical values and numerical ranges herein, which do not limit the present invention. Each numerical range specified using "to" herein represents a range including the numerical values indicated before and after "to" as the minimum value and the maximum value, respectively. In the numerical ranges described stepwisely herein, the upper limit or lower limit described in one numerical range may be replaced by the upper limit or lower limit of another numerical range described stepwisely. Also in the numerical ranges described herein, the upper limit or lower limit of the numerical ranges may be replaced by a value shown in Examples.

An "electrode" herein means a positive electrode or a negative electrode. Similarly, an electrode current collector means a positive electrode current collector or a negative electrode current collector, an electrode mixture layer means a positive electrode mixture layer or a negative electrode mixture layer, an electrode active material means a positive electrode active material or a negative electrode active material, an electrode active material layer means a positive electrode active material layer or a negative electrode active material layer, and an electrode precursor means a positive electrode precursor or a negative electrode precursor. The same is applied to other similar expressions.

Figure 1:
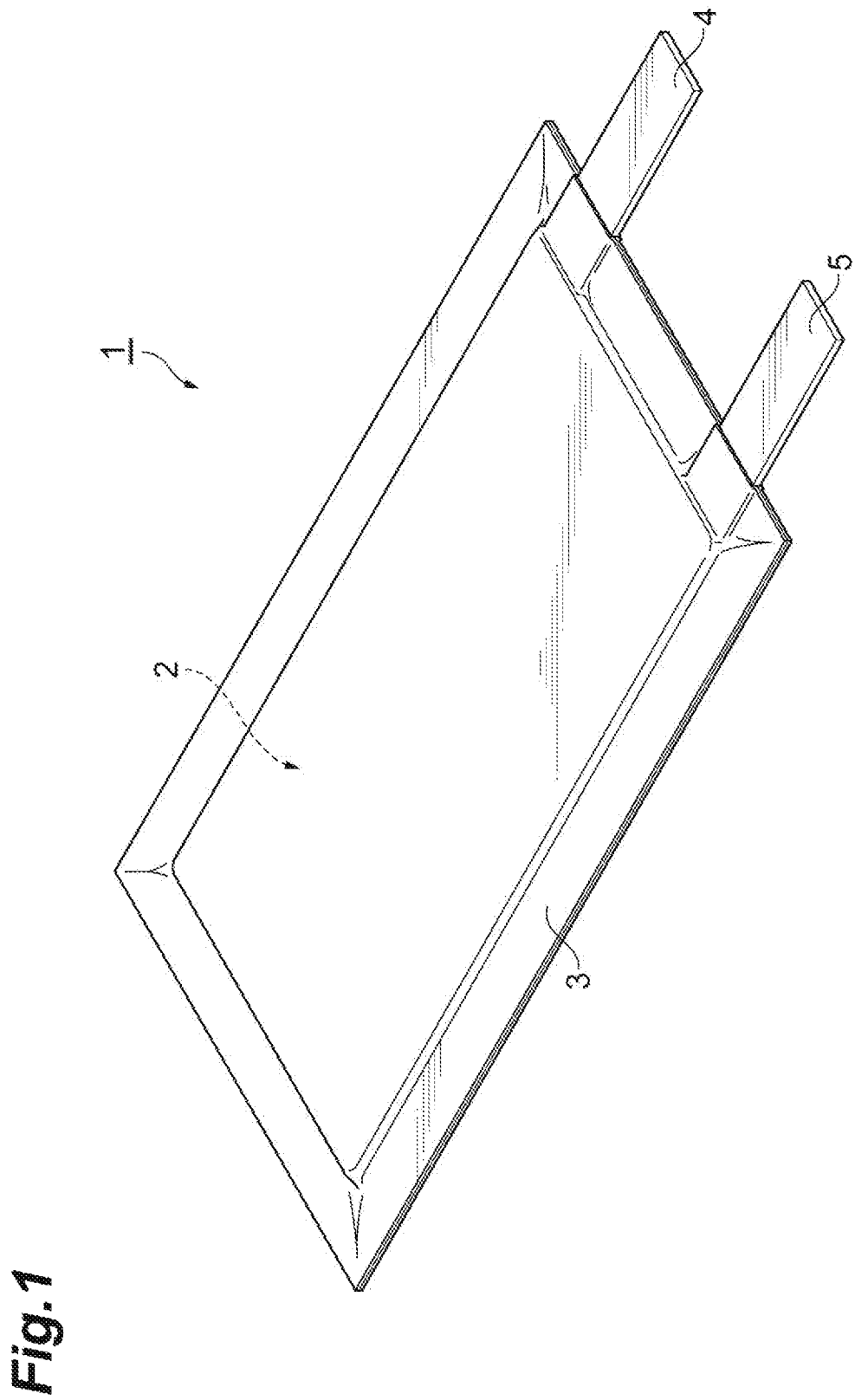
FIG. 1 is a perspective view showing an electrochemical device (secondary battery) according to First Embodiment.

Herein, as abbreviations, the following may be used.
[EMI]⁺: 1-ethyl-3-methylimidazolium cation
[DEME]⁺: N,N-diethyl-N-methyl-N-(2-methoxyethyl)ammonium cation
[Py12]⁺: N-ethyl-N-methylpyrrolidinium cation
[Py13]⁺: N-methyl-N-propylpyrrolidinium cation
[PP13]⁺: N-methyl-N-propylpiperidinium cation
[FSI]⁻: bis(fluorosulfonyl)imide anion
[TFSI]⁻: bis(trifluoromethanesulfonyl)imide anion
[f3C]⁻: tris(fluorosulfonyl)carbanion
[BOB]⁻: bis oxalate borate anion
[P(DADMA)][Cl]: poly(diallyldimethylammonium)chloride
[P(DADMA)][TFSI]: poly(diallyldimethylammonium)bis(trifluoromethanesulfonyl)imide First Embodiment FIG. 1 is a perspective view showing an electrochemical device (secondary battery) according to First Embodiment. The electrochemical device may be a secondary battery. Hereinbelow, an aspect of a secondary battery will be described.

As shown in FIG. 1, a secondary battery 1 comprises a pair of electrodes and an electrolyte layer, that is, an electrode group 2 composed of a positive electrode, a negative electrode, and an electrolyte layer, and a bag-like battery outer packaging 3 to accommodate the electrode group 2. A positive electrode collector tab 4 and a negative electrode collector tab 5 are provided respectively on positive electrode and negative electrode. The positive electrode collector tab 4 and the negative electrode collector tab 5 protrude from the inside of the battery outer packaging 3 to the outside such that the positive electrode and the negative electrode can each electrically connect to the outside of the secondary battery 1.

The battery outer packaging 3 may be formed with a laminate film, for example. The laminate film may be a layered film in which, for example, a resin film such as a polyethylene terephthalate (PET) film, a foil of metal such as aluminum, copper, and stainless steel, and a sealant layer such as polypropylene are layered in this order.

Figure 2:
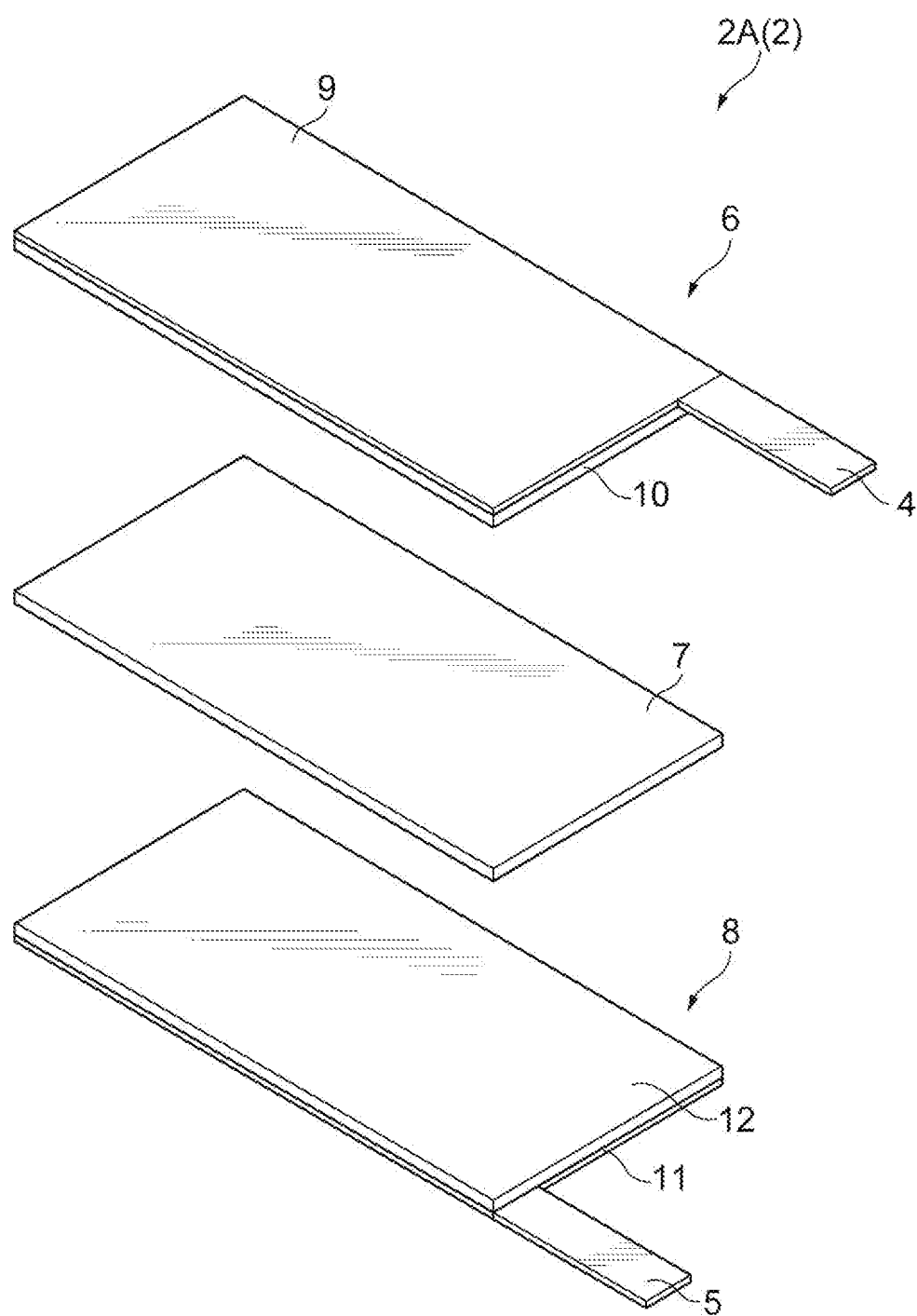
FIG. 2 is an exploded perspective view showing the electrode group of the electrochemical device (secondary battery) shown in FIG. 1.

FIG. 2 is an exploded perspective view showing the electrode group of the electrochemical device (secondary battery) shown in FIG. 1. As shown in FIG. 2, an electrode group 2A comprises a pair of electrodes each having an electrode mixture layer and an electrolyte layer provided between the pair of electrodes, that is, a positive electrode 6, an electrolyte layer 7, and a negative electrode 8 in this order. The positive electrode 6 comprises a first current collector 9 and a positive electrode mixture layer 10 provided on the first current collector 9. The first current collector 9 is a positive electrode current collector. On the first current collector 9 of the positive electrode 6, a positive electrode collector tab 4 is provided. The negative electrode 8 comprises a second current collector 11 and a negative electrode mixture layer 12 provided on the second current collector 11. The second current collector 11 is a negative electrode current collector. On the second current collector 11 of the negative electrode 8, a negative electrode collector tab 5 is provided.

Figure 3:
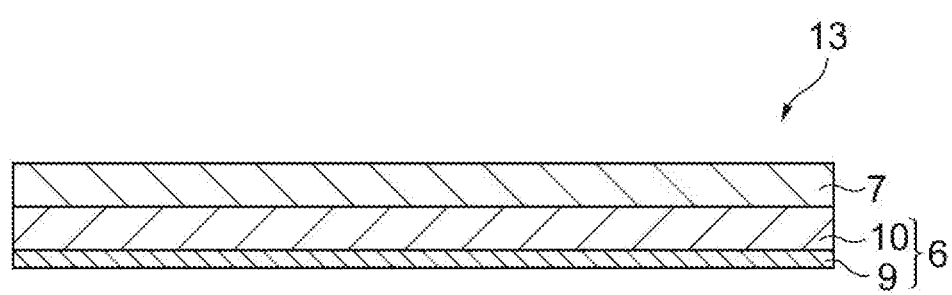
FIG. 3(a) is a schematic cross-sectional view showing a member (positive electrode member) for electrochemical devices (secondary batteries) according to one embodiment.
FIG. 3(b) is a schematic cross-sectional view showing a member (negative electrode member) for electrochemical devices (secondary batteries) according to another embodiment.
Figure 3:
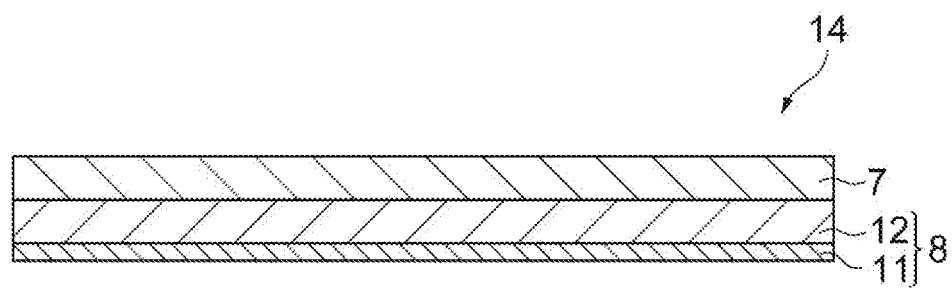

In one embodiment, a first battery member (member for electrochemical devices, positive electrode member) comprising the first current collector 9, the positive electrode mixture layer 10, and the electrolyte layer 7 in this order can be considered to be included in the electrode group 2A. FIG. 3(a) is a schematic cross-sectional view showing the first battery member (positive electrode member). As shown in FIG. 3(a), the first battery member 13 is a positive electrode member comprising the first current collector 9, the positive electrode mixture layer 10 provided on the first current collector 9, and the electrolyte layer 7 provided on the positive electrode mixture layer 10 in this order.

The first current collector 9 (positive electrode current collector) may be formed of aluminum, stainless steel, titanium or the like. The first current collector 9 may be specifically an aluminum perforated foil having pores of which pore diameter is 0.1 to 10 mm, an expanded metal, a foamed metal sheet or the like. The first current collector 9 may be formed of any material other than those described above as long as the material is not subject to change such as dissolution and oxidation during use of the battery, and additionally, its shape, production method or the like is not limited.

The thickness of the first current collector 9 may be 1 μm or more, 5 μm or more, or 10 μm or more. The thickness of the first current collector 9 may be 100 μm or less, 50 μm or less, or 20 μm or less.

The positive electrode mixture layer 10, in one embodiment, comprises a positive electrode active material, a specific polymer, a specific electrolyte salt, and a specific molten salt.

The positive electrode mixture layer 10 comprises the positive electrode active material. The positive electrode active material may be, for example, a lithium transition metal compound such as a lithium transition metal oxide and a lithium transition metal phosphate.

The lithium transition metal oxide may be lithium manganate, lithium nickelate, lithium cobaltate, or the like. The lithium transition metal oxide may be a lithium transition metal oxide obtained by substituting a portion of the transition metal such as Mn, Ni, and Co comprised in lithium manganate, lithium nickelate, lithium cobaltate, or the like with one or two or more other transition metals or metal elements (typical element) such as Mg and Al. That is, the lithium transition metal oxide may be a compound represented by $LiM^1O_2$ or $LiM^1O_4$ ($M^1$ includes at least one transition metal). The lithium transition metal oxide may be specifically $Li(Co_{1/3}Ni_{1/3}Mn_{1/3})O_2$, $LiNi_{1/2}Mn_{1/2}O_2$, $LiNi_{1/2}Mn_{3/2}O_4$, or the like.

The lithium transition metal oxide is a compound represented by the following formula (A) from the viewpoint of further enhancing the energy density:

$$Li_aNi_bCo_cM^2_dO_{2+e} \qquad (A)$$

In the formula (A), $M^2$ is at least one selected from the group consisting of Al, Mn, Mg, and Ca, a, b, c, d, and e are numbers each satisfying $0.2 \leq a \leq 1.2$, $0.5 \leq b \leq 0.9$, $0.1 \leq c \leq 0.4$, $0 \leq d \leq 0.2$, and $-0.2 \leq e \leq 0.2$ and satisfying $b+c+d=1$.

The lithium transition metal phosphate may be $LiFePO_4$, $LiMnPO_4$, $LiMn_xM^3_{1-x}PO_4$ ($0.3 \leq x \leq 1$, and $M^3$ is at least one element selected from the group consisting of Fe, Ni, Co, Ti, Cu, Zn, Mg, and Zr), or the like.

The content of the positive electrode active material may be 70% by mass or more, 80% by mass or more, or 90% by mass or more based on the total amount of the positive electrode mixture layer. The content of the positive electrode active material may be 99% by mass or less based on the total amount of the positive electrode mixture layer.

The positive electrode mixture layer 10 comprises a polymer having a structural unit represented by the following formula (1):

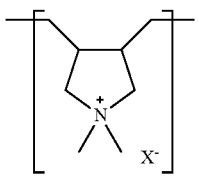

(1)

In the formula (1), X⁻ represents a counter anion. Examples of X⁻ herein include $BF_4^-$ (tetrafluoroborate anion), $PF_6^-$ (hexafluorophosphate anion), $N(FSO_2)_2^-$ (bis(fluorosulfonyl)imide anion, [FSI]⁻), $N(CF_3SO_2)_2^-$ (bis(trifluoromethanesulfonyl)imide anion, [TFSI]⁻), $C(SO_2F)_3^-$ (tris(fluorosulfonyl)carbanion, [f3C]⁻), $B(C_2O_4)_2^-$ (bisoxalatoborate anion, [BOB]⁻), $BF_3(CF_3)^-$, $BF_3(C_2F_5)^-$, $BF_3(C_3F_7)^-$, $BF_3(C_4F_9)^-$, $C(SO_2CF_3)_3^-$, $CF_3SO_2O^-$, $CF_3COO^-$, and RCOO⁻ (R is an alkyl group having 1 to 4 carbon atoms, a phenyl group, or a naphthyl group). Of these, X⁻ is preferably at least one selected from the group consisting of $BF_4^-$, $PF_6^-$, [FSI]⁻, [TFSI]⁻, and [f3C]⁻, more preferably [TFSI]⁻ or [FSI]⁻.

The viscosity average molecular weight Mv (g·mol⁻¹) of the polymer having a structural unit represented by the formula (1) is not particularly limited, and may be $1.0 \times 10^4$ or more or $1.0 \times 10^5$ or more. Also, the viscosity average molecular weight of the polymer may be $5.0 \times 10^6$ or less or $1.0 \times 10^6$ or less.

In the present description, the "viscosity average molecular weight" can be evaluated by viscometry, which is a general measuring method, and can be calculated from, for example, an intrinsic-viscosity number [η] measured based on JISK7367-3:1999.

It is preferred that the polymer having a structural unit represented by the formula (1) be a polymer composed only of the structural unit represented by the formula (1), that is a homopolymer, from the viewpoint of ionic conductivity.

The polymer having a structural unit represented by the formula (1) may be a polymer represented by the following formula (1A):

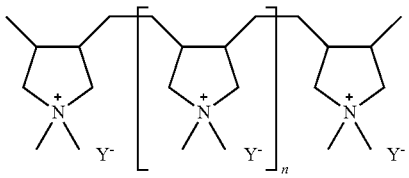

(1A)

In the formula (1A), n is 300 to 4000, and Y⁻ represents a counter anion. As Y⁻, it is possible to use one similar to those exemplified for X⁻.

n may be 300 or more, 400 or more, or 500 or more. Also, n may be 4000 or less, 3500 or less, or 3000 or less. Also, n may be 300 to 4000, 400 to 3500, or 500 to 3000.

The method for producing a polymer having a structural unit represented by the formula (1) is not particularly limited, and it is possible to use, for example, the method for production described in Journal of Power Sources 2009, 188, 558-563.

The polymer having a structural unit represented by the formula (1) (X⁻=[TFSI]⁻) can be obtained by, for example, the following production method.

First, poly(diallyldimethyl ammonium)chloride ([P(DADMA)][Cl]) is dissolved in deionized water and stirred to prepare a [P(DADMA)][Cl] aqueous solution. As [P(DADMA)][Cl], for example, a commercially available product can be uses as it is. Then, Li[TFSI] is separately dissolved in deionized water to prepare an aqueous solution comprising Li[TFSI].

Thereafter, the two aqueous solutions are mixed such that the molar ratio of Li[TFSI] to [P(DADMA)][Cl] (molar number of Li[TFSI]/molar number of [P(DADMA)][Cl]) falls within 1.2 to 2.0 and stirred for 2 to 8 hours to precipitate solid out, and the resulting solid is collected by filtration. By washing the solid using deionized water and drying the solid under vacuum for 12 to 48 hours, it is possible to obtain a polymer having a structural unit represented by the formula (1) ([P(DADMA)][TFSI]).

The content of the polymer having a structural unit represented by the formula (1) in the positive electrode mixture layer 10 may be 10 to 30% by mass based on the total amount of the polymer, the electrolyte salt, and the molten salt.

The positive electrode mixture layer 10 comprises at least one electrolyte salt selected from the group consisting of lithium salts, sodium salts, magnesium salts, and calcium salts.

As the electrolyte salt, ones used as an electrolyte salt for liquid electrolytes for common ion batteries can be used. The anion of the electrolyte salt may be a halide ion, (I⁻, Cl⁻, Br⁻, or the like), SCN⁻, $BF_4^-$, $BF_3(CF_3)^-$, $BF_3(C_2F_5)^-$, $BF_3(C_3F_7)^-$, $BF_3(C_4F_9)^-$, $PF_6^-$, $ClO_4^-$, $SbF_6^-$, [FSI]⁻, [TFSI]⁻, $N(C_2F_5SO_2)_2^-$, $BPh_4^-$, $B(C_2H_4O_2)_2^-$, [f3C]⁻, $C(CF_3SO_2)_3^-$, $CF_3COO^-$, $CF_3SO_2O^-$, $C_6F_5SO_2O^-$, [BOB]⁻, RCOO⁻ (R is an alkyl group having 1 to 4 carbon atoms, a phenyl group, or a naphthyl group), or the like. Of these, the anion of the electrolyte salt is preferably at least one selected from the group consisting of $PF_6^-$, $BF_4^-$, [FSI]⁻, [TFSI]⁻, [BOB]⁻, and $ClO_4^-$, more preferably [TFSI]⁻ or [FSI]⁻, still more preferably [FSI]⁻.

The lithium salt may be $LiPF_6$, $LiBF_4$, Li[FSI], Li[TFSI], Li[f3C], Li[BOB], $LiClO_4$, $LiBF_3(CF_3)$, $LiBF_3(C_2F_5)$, $LiBF_3(C_3F_7)$, $LiBF_3(C_4F_9)$, $LiC(SO_2CF_3)_3$, $LiCF_3SO_2O$, $LiCF_3COO$, LiRCOO (R is an alkyl group having 1 to 4 carbon atoms, a phenyl group, or a naphthyl group), or the like. These may be used singly or two or more of these may be used in combination.

The sodium salt may be $NaPF_6$, $NaBF_4$, Na[FSI], Na[TFSI], Na[f3C], Na[BOB], $NaClO_4$, $NaBF_3(CF_3)$, $NaBF_3(C_2F_5)$, $NaBF_3(C_3F_7)$, $NaBF_3(C_4F_9)$, $NaC(SO_2CF_3)_3$, $NaCF_3SO_2O$, $NaCF_3COO$, NaRCOO (R is an alkyl group having 1 to 4 carbon atoms, a phenyl group, or a naphthyl group), or the like. These may be used singly or two or more of these may be used in combination.

The magnesium salt may be $Mg(PF_6)_2$, $Mg(BF_4)_2$, $Mg[FSI]_2$, $Mg[TFSI]_2$, $Mg[f3C]_2$, $Mg[BOB]_2$, $Mg(ClO_4)_2$, $Mg[BF_3(CF_3)]_2$, $Mg[BF_3(C_2F_5)]_2$, $Mg[BF_3(C_3F_7)]_2$, $Mg[BF_3(C_4F_9)]_2$, $Mg[C(SO_2CF_3)_3]_2$, $Mg(CF_3SO_2O)_2$, $Mg(CF_3COO)_2$, $Mg(RCOO)_2$ (R is an alkyl group having 1 to 4 carbon atoms, a phenyl group, or a naphthyl group), or the like. These may be used singly or two or more of these may be used in combination.

The calcium salt may be $Ca(PF6)_2$, $Ca(BF4)_2$, $Ca[FSI]_2$, $Ca[TFSI]_2$, $Ca[f3C]_2$, $Ca[BOB]_2$, $Ca(ClO_4)_2$, $Ca[BF_3(CF_3)_3]_2$, $Ca[BF_3(C_2F_5)]_2$, $Ca[BF_3(C_3F_7)]_2$, $Ca[BF_3(C_4F_9)]_2$, $Ca[C(SO_2CF_3)_3]_2$, $Ca(CF_3SO_2O)_2$, $Ca(CF_3COO)_2$, $Ca(RCOO)_2$ (R is an alkyl group having 1 to 4 carbon atoms, a phenyl group, or a naphthyl group) or the like. These may be used singly or two or more of these may be used in combination.

Of these, the electrolyte salt is preferably a lithium salt, more preferably at least one selected from the group consisting of $LiPF_6$, $LiBF_4$, Li[FSI], Li[TFSI], Li[f3C], Li[BOB], and $LiClO_4$, still more preferably Li[TFSI] or Li[FSI], still more preferably Li[FSI] from the viewpoint of dissociation ability and electrochemical stability.

The mass ratio of the electrolyte salt to the polymer having a structural unit represented by the formula (1) (mass of the electrolyte salt/mass of the polymer having a structural unit represented by the formula (1)) is not particularly limited, and may be 0.1 or more, 0.15 or more, or 0.2 or more. When the mass ratio is 0.1 or more, the ion carrier concentration becomes sufficient and the ionic conductivity tends to further increase. The upper limit of the mass ratio may be, for example, 1.0 or less, 0.9 or less, or 0.8 or less.

The content of the electrolyte salt in the positive electrode mixture layer 10 may be 0.1 to 40% by mass based on the total amount of the polymer, the electrolyte salt, and the molten salt.

The positive electrode mixture layer 10 comprises a molten salt having a melting point of 250° C. or less. A molten salt is composed of a cation and an anion. As the molten salt, a common ionic liquid or plastic crystal, as long as the melting point thereof is 250° C. or less, can be used without limitation.

It should be noted that, in the present description, an "ionic liquid" means a molten salt that is liquid at 30° C., that is, a molten salt of which a melting point is 30° C. or less, and a "plastic crystal" means a molten salt that is solid at 30° C., that is, a molten salt of which a melting point is higher than 30° C.

The ionic liquid, if it is a molten salt that is liquid at 30° C., can be used without particular limitation. Specifically, examples thereof include ionic liquids that are obtained by combining a cation such as $[EMI]^+$, $[DEME]^+$, $[Py12]^+$, $[Py13]^+$, or $[PP13]^+$ and an anion such as $PF_6^-$, $BF_4^-$, $[FSI]^-$, $[TFSI]^-$, or $[f3C]^-$, the ionic liquids being liquid at 30° C. More specifically, examples thereof include [EMI][TFSI] (melting point: −15° C.), [DEME][TFSI] (melting point: −83° C.), [EMI][FSI] (melting point: −13° C.), [DEME][FSI] (melting point: <25° C.), and [Py13][FSI](melting point: −10° C.). These may be used singly or two or more of these may be used in combination. Also, the ionic liquid may be used in combination with a plastic crystal mentioned below.

The melting point of the ionic liquid is not particularly limited and may be preferably 25° C. or less, 10° C. or less, or 0° C. or less. When the melting point is 25° C. or less, the ionic conductivity tends to be unlikely to decrease even at room temperature (e.g., 25° C.) or less. The lower limit of the melting point of the ionic liquid is not particularly limited, and may be −150° C. or more, −120° C. or more, or −90° C. or more.

A plastic crystal, if it is a molten salt that is solid at 30° C. and of which a melting point is 250° C. or less, can be used without particular limitation. Specifically, examples thereof include plastic crystals that are obtained by combining a cation such as $[EMI]^+$, $[DEME]^+$, $[Py12]^+$, $[Py13]^+$, or $[PP13]^+$ and an anion such as $PF_6^-$, $BF_4^-$, $[FSI]^-$, $[TFSI]^-$, or $[f3C]^-$, the plastic crystals being solid at 30° C. More specifically, examples thereof include [Py12][TFSI] (melting point: 90° C.), [Py12][FSI] (melting point: 205° C.), [DEME][f3C] (melting point: 69° C.), [Py13][f3C] (melting point: 177° C.), and [PP13][f3C] (melting point: 146° C.).

These may be used singly or two or more of these may be used in combination. Also, the plastic crystal may be used in combination with the ionic liquid mentioned above. When the melting point is 80° C. or more, the plastic crystal tends to further suppress liquid leakage during normal battery use. Accordingly, a battery having a bipolar electrode in which electrodes are layered in series in a single cell can be achieved by use of the plastic crystal.

The cation of the molten salt is, from the viewpoint of ionic conductivity, preferably $[EMI]^+$, $[DEME]^+$, or $[Py13]^+$, more preferably $[EMI]^+$. The anion of the molten salt is, from the viewpoint of ionic conductivity, preferably $[FSI]^-$ or $[TFSI]^-$, more preferably $[FSI]^-$. It is preferable for the molten salt, from the viewpoint of ionic conductivity, to comprise [EMI][FSI], [DEME][FSI], or [Py13][FSI], more preferable to comprise [EMI][FSI].

The melting point of the plastic crystal is 250° C. or less, and may be 200° C. or less, 150° C. or less, or 100° C. or less. When the melting point is 250° C. or less, the ionic conductivity tends to increase. The lower limit of the melting point of the molten salt is not particularly limited, and can be 80° C. or more, for example.

The content of the molten salt may be 10 to 70% by mass based on the total amount of the polymer, the electrolyte salt, and the molten salt.

The positive electrode mixture layer 10 may further comprise a conductive agent, a binder, and the like.

The conductive agent may be carbon black, graphite, carbon fiber, carbon nanotubes, acetylene black, or the like.

The content of the conductive agent may be 1 to 15% by mass based on the total amount of the positive electrode mixture layer.

Examples of the binder may include resins such as polyvinylidene fluoride, polyacrylonitrile, styrene-butadiene rubber, carboxymethyl cellulose, fluorine rubber, ethylene-propylene rubber, polyacrylic acid, polyimide, and polyamide; and copolymer resins having these resins as the main skeleton (e.g., polyvinylidene fluoride-hexafluoropropylene copolymer).

The content of the binder may be 1 to 15% by mass based on the total amount of the positive electrode mixture layer.

The thickness of the positive electrode mixture layer 10 is not particularly limited, and may be 10 μm or more, 20 μm or more, or 30 μm or more. The thickness of the positive electrode mixture layer 10 may be 100 μm or less, 80 μm or less, or 60 μm or less.

The mixture density of the positive electrode mixture layer 10 may be 1 g/cm³ or more.

The electrolyte layer 7 comprises an inorganic solid electrolyte. When the electrolyte layer 7 comprises an inorganic solid electrolyte, it is possible to relatively reduce flammable components, and the risk of battery ignition tends to be reduced. The electrolyte layer 7 may be one consisting of an inorganic solid electrolyte and may be, for example, an inorganic solid electrolyte formed into a sheet form (inorganic solid electrolyte sheet).

The inorganic solid electrolyte is preferably a(n) (composite) oxide, more preferably a(n) (composite) oxide represented by the following formula (2) or a(n) (composite) oxide represented by the following formula (3):

$$Li_{7-b}La_{3-a}A^1_a Zr_{2-b}M^1_b O_{12} \tag{2}$$

In the formula (2), $A^1$ represents at least one metal element selected from the group consisting of Y, Nd, Sm, and Gd, $M^1$ represents at least one metal element selected from the group consisting of Nb and Ta, 0≤a<3, and 0≤b<2.

$$Li_{1+c+d}Al_c(Ti,Ge)_{2-c}Si_d P_{3-d}O_{12} \tag{3}$$

In the formula (3), $0 \leq c < 2$, and $0 \leq d < 3$. Note that (Ti, Ge) means either one of Ti or Ge or both of Ti and Ge.

The oxide represented by the formula (2) may have a garnet-type crystal structure. The crystal system of the oxide represented by the formula (2) may be a cubic system or tetragonal crystal system and is preferably a cubic system from the viewpoint of having more excellent ionic conductivity.

The crystal structure of the oxide represented by the formula (2) can be confirmed by performing powder X-ray diffractometry using a CuKα-ray. The oxide has major peaks in the ranges of the diffraction angle (2θ)=16.0° to 17.0°, 25.0° to 26.0°, 27.0° to 28.0°, 33.0° to 34.0°, 35.0° to 36.0°, 37.0° to 38.0°, 44.0° to 45.0°, and 52.0° to 53.0° in a powder X-ray diffraction pattern (CuKα:λ=1.5418 Å).

The oxide represented by the formula (2) may be specifically $Li_7La_3Zr_2O_{12}$ (LLZ), $Li_{6.75}La_3Zr_{1.75}Nb_{0.25}O_{12}$ (LLZ-Nb), $Li_{6.75}La_3Zr_{1.75}Ta_{0.25}O_{12}$ or the like.

The oxide represented by the formula (3) may have a Li-substituted NASICON-type crystal structure.

The crystal structure of the oxide represented by the formula (3) can be confirmed by performing powder X-ray diffractometry using a CuKα-ray. The oxide has major peaks in the ranges of the diffraction angle (2θ)=15.0° to 16.0°, 22.0° to 23.0°, 25.0 to 26.0°, 31.0° to 32.0°, 34.0° to 35.0°, 37.0° to 38.0°, 49.0° to 50.0°, and 59.0° to 60.0° in a powder X-ray diffraction pattern (CuKα:λ=1.5418 Å).

As the oxide represented by the formula (3), a commercially available product may be used, and, for example, lithium ion conductive glass ceramics LICGC™ AG-01 (manufactured by OHARA INC.) or the like can be suitably used.

The thickness of the electrolyte layer may be 5 to 500 μm from the viewpoint of enhancing the strength and improving the safety.

In another embodiment, a second battery member (member for electrochemical devices, negative electrode member) comprising a second current collector 11, a negative electrode mixture layer 12, and an electrolyte layer 7 in this order can be considered to be included in an electrode group 2A. FIG. 3(b) is a schematic cross-sectional view showing the second battery member (negative electrode member). As shown in FIG. 3(b), the second battery member 14 is a negative electrode member comprising the second current collector 11, the negative electrode mixture layer 12 provided on the second current collector 11, and the electrolyte layer 7 provided on the negative electrode mixture layer 12 in this order. The electrolyte layer 7 is similar to the electrolyte layer 7 in the first battery member 13 mentioned above, and the description thereof will be omitted here.

The second current collector 11 (negative electrode current collector) may be formed of copper, stainless steel, titanium, nickel or the like. The second current collector 11 may be specifically a rolled copper foil, a perforated copper foil having a pore diameter of 0.1 to 10 mm, an expanded metal, a foamed metal sheet or the like. The second current collector 11 may be formed of any material other than those described above, and additionally, its shape, production method or the like is not limited.

The thickness of the second current collector 11 may be 1 μm or more, 5 μm or more, or 10 μm or more. The thickness of the second current collector 11 may be 100 μm or less, 50 μm or less, or 20 μm or less.

The negative electrode mixture layer 12, in one embodiment, comprises a negative electrode active material, a specific polymer, a specific electrolyte salt, and a specific molten salt.

The negative electrode mixture layer 12 comprises the negative electrode active material.

As the negative electrode active material, ones used as a negative electrode active material in the field of common energy devices such as secondary batteries can be used. Examples of the negative electrode active material include graphite such as natural graphite (such as scale-like graphite) and artificial graphite, amorphous carbon, carbon black such as acetylene black, Ketjenblack, channel black, furnace black, lamp black, and thermal black, carbon fibers, metal oxides such as $Li_4Ti_5O_{12}$, metal lithium, metal sodium, metal calcium, metal magnesium, metal complexes, and organic polymer compounds. These may be used singly or two or more of these may be used in combination. Of these, the negative electrode active material may be at least one selected from the group consisting of graphite, amorphous carbon, carbon black, metal oxides, metal lithium, metal sodium, metal calcium, and metal magnesium.

The content of the negative electrode active material may be 60% by mass or more, 65% by mass or more, or 70% by mass or more based on the total amount of the negative electrode mixture layer. The content of the negative electrode active material may be 99% by mass or less, 95% by mass or less, or 90% by mass or less based on the total amount of the negative electrode mixture layer.

The negative electrode mixture layer 12 comprises a polymer having a structural unit represented by the formula (1) comprised in the positive electrode mixture layer 10, at least one electrolyte salt selected from the group consisting of lithium salts, sodium salts, calcium salts, and magnesium salts, and a molten salt having a melting point of 250° C. or less. The content of these may be the same as in the positive electrode mixture layer 10.

The negative electrode mixture layer 12 may further comprise a conductive agent, a binder, and the like that may be comprised in the positive electrode mixture layer 10. The contents of these is the same as those in the positive electrode mixture layer 10.

The thickness of the negative electrode mixture layer 12 is not particularly limited, and may be 10 μm or more, 15 μm or more, or 20 μm or more. The thickness of the negative electrode mixture layer 12 may be 50 μm or less, 45 μm or less, or 40 μm or less.

The mixture density of the negative electrode mixture layer 12 may be 1 g/cm³ or more.

Subsequently, a method for producing the secondary battery 1 mentioned above will be described. A method for producing the secondary battery 1 according to the First Embodiment comprises a first step of obtaining the positive electrode 6, a second step of obtaining the negative electrode 8, and a third step of providing the electrolyte layer 7 between the positive electrode 6 and the negative electrode 8.

A method for producing the positive electrode 6 in the first step comprises a step of providing a positive electrode precursor in which a positive electrode active material layer comprising a positive electrode active material is provided on at least one principal surface of the first current collector 9, a step of adding a slurry comprising a polymer having a structural unit represented by the formula (1), an electrolyte salt, a molten salt, and a dispersion medium to the positive electrode active material layer, and a step of removing the volatile component from the slurry added to the positive electrode active material layer to form a positive electrode mixture layer.

The positive electrode active material layer in the positive electrode precursor can be obtained, for example, by preparing a slurry in which a positive electrode active material, a conductive agent, a binder, and the like are dispersed in a dispersion medium, applying the slurry to the first current collector 9, and drying the slurry. The dispersion medium is not particularly limited and may be water, an aqueous solvent such as a mixed solvent of alcohol and water, or an organic solvent such as N-methyl-2-pyrrolidone.

Subsequently, a slurry in which a polymer having a structural unit represented by the formula (1), an electrolyte salt, and a molten salt are dispersed in a dispersion medium is prepared. Thereafter, the slurry is added to the positive electrode active material layer. A method for adding the slurry is not particularly limited, and examples thereof include dropping, application, and printing. The dispersion medium is not particularly limited as long as a polymer is dissolved in the medium, and may be acetone, ethyl methyl ketone, γ-butyrolactone, or the like.

Thereafter, the volatile component is removed from the solution added to the positive electrode active material layer to form a positive electrode mixture layer. The method for removing the volatile component is not particularly limited and can be performed in a manner usually employed.

The negative electrode 8 in the second step can be obtained by a production method similar to that for the positive electrode 6 mentioned above. That is, the method for producing the negative electrode 8 comprises a step of providing a negative electrode precursor in which a negative electrode active material layer comprising a negative electrode active material is provided on at least one principal surface of the negative electrode current collector, a step of adding slurry comprising a polymer having a structural unit represented by the formula (1), an electrolyte salt, a molten salt, and a dispersion medium to the negative electrode active material layer, and a step of removing the volatile component from the slurry added to the negative electrode active material layer to form a negative electrode mixture layer.

In the third step, the positive electrode 6, the electrolyte layer 7, and the negative electrode 8 are laminated in this order. The electrolyte layer 7 may be an inorganic solid electrolyte sheet obtained by forming an inorganic solid electrolyte into a sheet form. Thereby, a secondary battery according to First Embodiment can be obtained. In this time, the electrolyte layer 7 (inorganic solid electrolyte sheet) is laminated such that the electrolyte layer 7 is in contact with the positive electrode mixture layer 10 of the positive electrode 6, and is in contact with the negative electrode mixture layer 12 of the negative electrode 8, that is, such that the first current collector 9, the positive electrode mixture layer 10, the electrolyte layer 7, the negative electrode mixture layer 12, and the second current collector 11 are arranged in this order.

Second Embodiment

Figure 4:
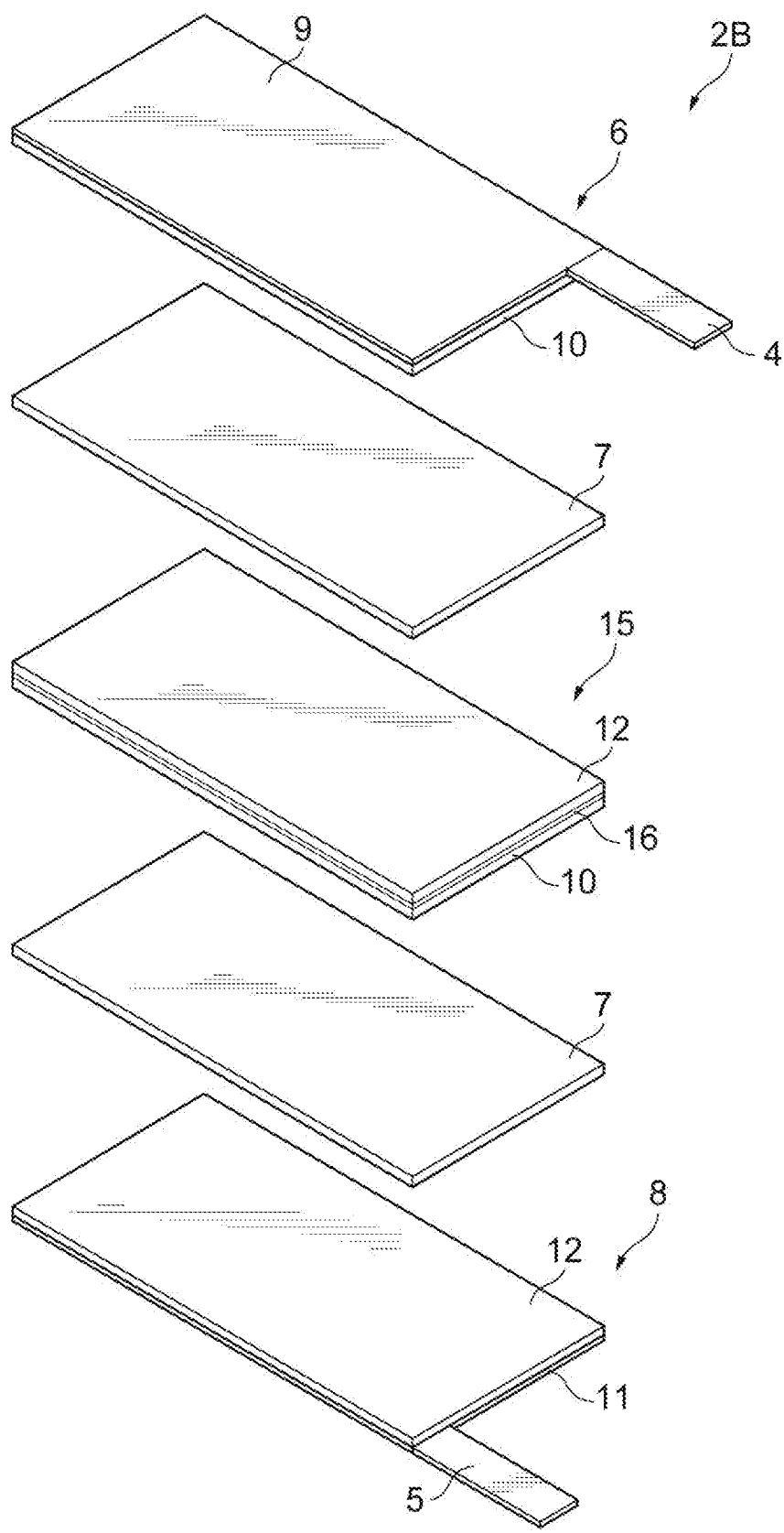
FIG. 4 is an exploded perspective view showing the electrode group of an electrochemical device (secondary battery) according to Second Embodiment.

Subsequently, a secondary battery according to Second Embodiment will be described. FIG. 4 is an exploded perspective view showing the electrode group of an electrochemical device (secondary battery) according to Second Embodiment. As shown in FIG. 4, the point where the secondary battery in Second Embodiment is different from the secondary battery in First Embodiment is that an electrode group 2B further comprises a bipolar electrode 15. That is, the electrode group 2B comprises a positive electrode 6, a first electrolyte layer 7, a bipolar electrode 15, a second electrolyte layer 7, and a negative electrode 8 in this order.

The bipolar electrode 15 comprises a third current collector 16, a positive electrode mixture layer 10 provided on the surface of the side of the negative electrode 8 of the third current collector 16, and a negative electrode mixture layer 12 provided on the surface of the side of the positive electrode 6 of the third current collector 16.

Figure 5:
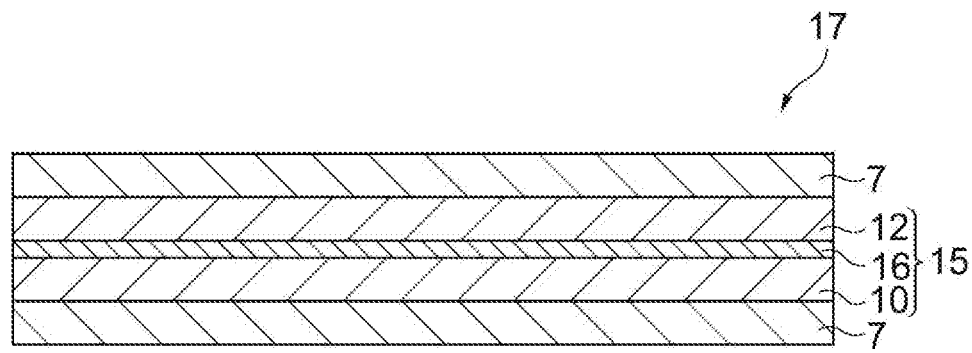
FIG. 5 is a schematic cross sectional view showing a member (bipolar electrode member) for electrochemical devices (secondary batteries) according to another embodiment.

In the secondary battery of Second Embodiment, a third battery member (bipolar electrode member) comprising the first electrolyte layer 7, the bipolar electrode 15, and the second electrolyte layer 7 in this order can be considered to be included in the electrode group 2B. FIG. 5 is a schematic cross-sectional view showing the third battery member (bipolar electrode member). As shown in FIG. 5, the third battery member 17 comprises the third current collector 16, the positive electrode mixture layer 10 provided on one surface of the third current collector 16, the second electrolyte layer 7 provided on the side of the positive electrode mixture layer 10 opposite to the third current collector 16, the negative electrode mixture layer 12 provided on the other surface of the third current collector 16, and the first electrolyte layer 7 provided on the side of the negative electrode mixture layer 12 opposite to the third current collector 16.

The third current collector 16 may be formed of, for example, a single metal such as aluminum, stainless steel, or titanium, a clad material obtained by rolling and joining aluminum and copper or stainless steel and copper, or the like.

The first electrolyte layer 7 and the second electrolyte layer 7 may be the same or different from each other and are preferably the same.

EXAMPLES

Hereinbelow, the invention will be described more specifically according to Examples, but the present invention is not intended to be limited to these Examples.

[Production of Positive Electrode Precursor]

Mixed were 66 parts by mass of $Li(Co_{1/3}Ni_{1/3}Mn_{1/3})O_2$ (positive electrode active material), 4 parts by mass of acetylene black (conductive agent, trade name: Li400, average particle size 48 nm (manufacturer catalog value), Denka Company Limited), 14 parts by mass of a polyvinylidene fluoride solution (binder, trade name: Kureha KF polymer #1120, solid content: 12% by mass, KUREHA CORPORATION), and 15 parts by mass of N-methyl-2-pyrrolidone (dispersion medium, NMP) to prepare a slurry. This slurry was applied on a principal surface of a positive electrode current collector (an aluminum foil of which thickness is 20 µm) and dried at 120° C. Then, rolling was conducted to form a positive electrode active material layer in which the amount applied on one surface was 120 g/m² and the mixture density was 2.7 g/cm³, and a positive electrode precursor was produced.

[Production of Negative Electrode Precursor]

Mixed were 52 parts by mass of graphite (negative electrode active material, Hitachi Chemical Company, Ltd.), 0.4 parts by mass of carbon nanotubes (conductive agent, trade name: VGCF, fiber diameter 150 nm (manufacturer catalog value), Showa Denko K K), 1.4 parts by mass of highly pure graphite (conductive agent, trade name: JSP, average particle size 7 µm (manufacturer catalog value), Nippon Graphite Industries, Co, Ltd.), 21.8 parts by mass of a polyvinylidene fluoride solution (binder, trade name: Kureha KF polymer #9130, solid content: 13% by mass, KUREHA CORPORATION), and 24.4 parts by mass of N-methyl-2-pyrrolidone (dispersion medium, NMP) to prepare a slurry. This slurry was applied on a principal surface of a negative electrode current collector (a copper foil of which thickness is 10 μm) and dried at 80° C. Then, rolling was conducted to form a negative electrode active material layer in which the amount applied on one surface was 60 g/m² and the mixture density was 1.6 g/cm³, and a negative electrode precursor was produced.

[Synthesis of Polymer]

A polymer having a structural unit represented by the formula (1) was synthesized by converting the counter anion Cl⁻ of poly(diallyldimethyl ammonium)chloride to [TFSI]⁻.

First, 100 parts by mass of a [P(DADMA)][Cl] aqueous solution (weight average molecular weight 400000 to 500000, 20% by mass aqueous solution, manufactured by Sigma-Aldrich Co. LLC.) was diluted with 500 parts by mass of distilled water to dilute the polymer aqueous solution. Then, 43 parts by mass of Li[TFSI] (manufactured by KISHIDA CHEMICAL Co., Ltd.) was dissolved in 100 parts by mass of water to prepare a Li[TFSI] aqueous solution. This was added dropwise to the diluted polymer aqueous solution, and a white precipitate was obtained by stirring for two hours. The precipitate was separated by filtration, and after washing with 400 parts by mass of distilled water, filtration was conducted again. Washing and filtration were repeated five times. Thereafter, moisture was evaporated by vacuum drying at 105° C. to obtain [P(DADMA)][TFSI]. The viscosity average molecular weight of [P(DADMA)][TFSI] was $2.11 \times 10^6$ g·mol⁻¹.

After the viscosity of the polymer [η] at 25° C. was measured by using polymethyl methacrylate (PMMA) as the reference material and using an Ubbelohde viscometer, the viscosity average molecular weight Mv was calculated based on [η]=KMv (wherein K represents an extension factor, and the value depends on the temperature, the polymer, and the nature of the solvent).

[Preparation of Slurry Comprising Polymer]

Li[FSI] (electrolyte salt, manufactured by KANTO CHEMICAL CO., INC.) was dissolved in [EMI][FSI](molten salt, manufactured by KANTO CHEMICAL CO., INC., melting point: −13° C.) to produce a 1.6 mol/L Li[FSI] solution in [EMI][FSI]. To 16 parts by mass of [P(DADMA)][TFSI] (polymer), 84 parts by mass of the Li[FSI] solution and 72 parts by mass of acetone as a dispersion medium were added and stirred to prepare a slurry comprising a polymer.

[Provision of Electrolyte Layer (Inorganic Solid Electrolyte Sheet)]

Provided were inorganic solid electrolyte sheets of 20 mm in diameter as follows.

$Li_{6.75}La_3Zr_{1.75}Nb_{0.25}O_{12}$ (oxide represented by the formula (2), thickness: 300 μm, manufactured by Toshima Manufacturing Co., Ltd.)

LICGC™ AG-01 (oxide represented by the formula (3), thickness: 150 μm, manufactured by OHARA INC.)

Example 1

<Production of Positive Electrode>

The slurry comprising a polymer was applied to the positive electrode active material layer, as the positive electrode precursor produced above, by a doctor blade method with a gap of 200 μm. Thereafter, pressure reduction of 0.05 MPa and opening into the atmosphere were repeated 10 times using a vacuum desiccator to produce a positive electrode mixture layer, and a positive electrode comprising the positive electrode mixture layer was obtained. To produce a battery, the positive electrode obtained was punched into a disc of 15 mm in diameter.

<Production of Negative Electrode>

The slurry comprising a polymer was applied to the negative electrode active material layer, as the negative electrode precursor produced above, by a doctor blade method with a gap of 200 μm. Thereafter, pressure reduction of 0.05 MPa and opening into the atmosphere were repeated 10 times using a vacuum desiccator to produce a negative electrode mixture layer, and a negative electrode comprising the negative electrode mixture layer was obtained. To produce a battery, the negative electrode obtained was punched into a disc of 16 mm in diameter.

[Production of Battery]

As an electrolyte layer, an inorganic solid electrolyte sheet of $Li_{6.75}La_3Zr_{1.75}Nb_{0.25}O_{12}$ was used. The positive electrode, the electrolyte layer, and the negative electrode were layered in this order and placed in a CR2032-type coin cell case, and a lithium ion secondary battery of Example 1 was obtained by crimp-sealing the top of the battery case via an insulating gasket. It should be noted that production of the battery was performed in a glove box under an argon atmosphere.

Example 2

A lithium ion secondary battery of Example 2 was obtained in the same manner as in Example 1 except that the inorganic solid electrolyte sheet of $Li_{6.75}La_3Zr_{1.75}Nb_{0.25}O_{12}$ as the electrolyte layer was replaced by an inorganic solid electrolyte sheet of LICGC™ AG-01.

Comparative Example 1

A lithium ion secondary battery of Comparative Example 1 was obtained in the same manner as in Example 2 except that the slurry comprising a polymer was not applied to the positive electrode active material layer and the negative electrode active material layer.

[Evaluation of Battery Performance]

The lithium ion secondary batteries produced by the above-described method were used to evaluate battery performance. A charge and discharge device (TOYO SYSTEM CO, LTD, trade name: TOSCAT-32) was used to conduct charge and discharge measurement at 25° C. and 0.05 C. It should be noted that C means "Current value [A]/designed theoretical capacity [Ah]" and 1 C represents a current value in full charge or full discharge of the battery in an hour. The results are shown in Table 1.

TABLE 1

| Item | Charge capacity [mAh/g] | Discharge capacity [mAh/g] |
| --- | --- | --- |
| Example 1 | 144 | 130 |
| Example 2 | 115 | 110 |
| Comparative Example 1 | 0 | 0 |

In the lithium ion secondary batteries of Examples 1 and 2, the charge and discharge capacities were dramatically improved in comparison with those of the lithium ion secondary battery of Comparative Example 1. This suggests that a good lithium ion conductive path has been formed in the positive electrode mixture layer and in the negative electrode mixture layer. From these results, it was confirmed that the member for electrochemical devices of the present invention can improve the battery characteristics even when an oxide-based inorganic solid electrolyte, poor in flexibility, is used in the electrolyte layer.

REFERENCE SIGNS LIST

1 ... secondary battery, 2, 2A, 2B ... electrode group, 3 ... battery outer packaging, 4 ... positive electrode collector tab, 5 ... negative electrode collector tab, 6 ... positive electrode, 7 ... electrolyte layer, 8 ... negative electrode, 9 ... first current collector, 10 ... positive electrode mixture layer, 11 ... second current collector, 12 ... negative electrode mixture layer, 13 ... first battery member, 14 ... second battery member 15 ... bipolar electrode, 16 ... third current collector, 17 ... third battery member

The invention claimed is:

1. A member for electrochemical devices comprising a current collector, an electrode mixture layer provided on the current collector, and an electrolyte layer provided on the electrode mixture layer in this order,
wherein the electrode mixture layer comprises an electrode active material, a polymer having a structural unit represented by the following formula (1), at least one electrolyte salt selected from the group consisting of lithium salts, sodium salts, calcium salts, and magnesium salts, and a molten salt having a melting point of 250° C. or less, and
the electrolyte layer comprises an oxide-based inorganic solid electrolyte, and
wherein the electrode mixture layer contacts the electrolyte layer:

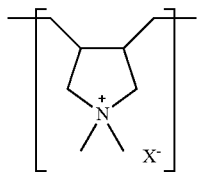
(1)

wherein X⁻ represents a counter anion.

2. The member for electrochemical devices according to claim 1, wherein the oxide-based inorganic solid electrolyte is an oxide represented by the following formula (2):

$$Li_{7-b}La_{3-a}A^1_a Zr_{2-b}M^1_b O_{12} \qquad (2)$$

wherein $A^1$ represents at least one metal element selected from the group consisting of Y, Nd, Sm, and Gd, and
wherein $M^1$ represents at least one metal element selected from the group consisting of Nb and Ta, $0 \leq a < 3$, and $0 \leq b < 2$.

3. The member for electrochemical devices according to claim 1, wherein the oxide-based inorganic solid electrolyte is an oxide represented by the following formula (3):

$$Li_{1+c+d}Al_c(Ti,Ge)_{2-c}Si_d P_{3-d}O_{12} \qquad (3)$$

wherein $0 \leq c < 2$ and $0 \leq d < 3$.

4. The member for electrochemical devices according to claim 1, wherein a content of the polymer in the electrode mixture layer is 10 to 30% by mass based on a total amount of the polymer, the electrolyte salt, and the molten salt.

5. The member for electrochemical devices according to claim 1, wherein an anion of the electrolyte salt is a bis(fluorosulfonyl)imide anion or bis(trifluoromethanesulfonyl)imide anion.

6. The member for electrochemical devices according to claim 1, wherein a cation of the electrolyte salt is a 1-ethyl-3-methylimidazolium cation, a N,N-diethyl-N-methyl-N-(2-methoxyethyl)ammonium cation, or a N-methyl-N-propylpyrrolidinium cation.

7. The member for electrochemical devices according to claim 1,
wherein the electrode mixture layer is a negative electrode mixture layer, the electrode active material is a negative electrode active material, and the negative electrode active material is at least one selected from the group consisting of graphite, amorphous carbon, carbon black, metal oxides, metal lithium, metal sodium, metal calcium, and metal magnesium.

8. An electrochemical device comprising:
a pair of electrodes each having an electrode mixture layer; and
an electrolyte layer provided between the pair of electrodes;
wherein the electrode mixture layer comprises an electrode active material, a polymer having a structural unit represented by the following formula (1), at least one electrolyte salt selected from the group consisting of lithium salts, sodium salts, calcium salts, and magnesium salts, and a molten salt having a melting point of 250° C. or less, and
the electrolyte layer comprises an oxide-based inorganic solid electrolyte, and
wherein the electrode mixture layer contacts the electrolyte layer:

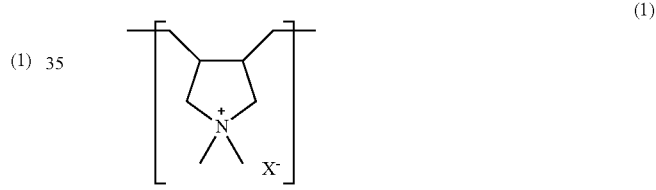
(1)

wherein X⁻ represents a counter anion.

9. The electrochemical device according to claim 8, wherein the oxide-based inorganic solid electrolyte is an oxide represented by the following formula (2):

$$Li_{7-b}La_{3-a}A^1_a Zr_{2-b}M^1_b O_{12} \qquad (2)$$

wherein $A^1$ represents at least one metal element selected from the group consisting of Y, Nd, Sm, and Gd, and
wherein $M^1$ represents at least one metal element selected from the group consisting of Nb and Ta, $0 \leq a < 3$, and $0 \leq b < 2$.

10. The electrochemical device according to claim 8, wherein the oxide-based inorganic solid electrolyte is an oxide represented by the following formula (3):

$$Li_{1+c+d}Al_c(Ti,Ge)_{2-c}Si_d P_{3-d}O_{12} \qquad (3)$$

wherein $0 \leq c < 2$ and $0 \leq d < 3$.

11. The electrochemical device according to claim 8, wherein a content of the polymer in the electrode mixture layer is 10 to 30% by mass based on a total amount of the polymer, the electrolyte salt, and the molten salt.

12. The electrochemical device according to claim 8, wherein an anion of the electrolyte salt is a bis(fluorosulfonyl)imide anion or a bis(trifluoromethanesulfonyl)imide anion.

13. The electrochemical device according to claim 8, wherein a cation of the electrolyte salt is a 1-ethyl-3- methylimidazolium cation, a N,N-diethyl-N-methyl-N-(2-methoxyethyl)ammonium cation, or a N-methyl-N-propylpyrrolidinium cation.

14. The electrochemical device according to claim 8, wherein the pair of electrodes is a positive electrode having a positive electrode mixture layer comprising a positive electrode active material and a negative electrode having a negative electrode mixture layer comprising a negative electrode active material, and wherein the negative electrode active material is at least one selected from the group consisting of graphite, amorphous carbon, carbon black, metal oxides, metal lithium, metal sodium, metal calcium, and metal magnesium.

* * * * *